US008643512B2

(12) United States Patent
Hsieh et al.

(10) Patent No.: US 8,643,512 B2
(45) Date of Patent: Feb. 4, 2014

(54) ELECTRONIC DEVICE AND METHOD FOR MANAGING BUS SERVICES

(75) Inventors: Chung-Jen Hsieh, Tu-Cheng (TW); Hsin-Fu Wang, Tu-Cheng (TW); Cheng-Ta Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 237 days.

(21) Appl. No.: 13/167,708

(22) Filed: Jun. 24, 2011

(65) Prior Publication Data

US 2012/0105256 A1 May 3, 2012

(30) Foreign Application Priority Data

Nov. 2, 2010 (TW) ............................... 99137573 A

(51) Int. Cl.
*G08G 1/123* (2006.01)
*G01C 22/00* (2006.01)

(52) U.S. Cl.
USPC ................. 340/994; 340/995.19; 340/995.23; 701/24; 701/25; 701/26

(58) Field of Classification Search
USPC ............. 340/994, 995.19, 995.23; 701/24–26
See application file for complete search history.

(56) References Cited

U.S. PATENT DOCUMENTS

| | | | | |
|---|---|---|---|---|
| 2002/0099500 | A1* | 7/2002 | Schmier et al. | 701/200 |
| 2005/0078014 | A1* | 4/2005 | Rapf | 340/994 |
| 2005/0219056 | A1* | 10/2005 | McHugh et al. | 340/573.4 |
| 2008/0062012 | A1* | 3/2008 | Diep | 340/994 |
| 2009/0310325 | A1* | 12/2009 | Wong et al. | 361/807 |
| 2010/0017215 | A1* | 1/2010 | Nigam et al. | 705/1 |
| 2010/0076679 | A1* | 3/2010 | Lee | 701/208 |

* cited by examiner

*Primary Examiner* — Jennifer Mehmood
*Assistant Examiner* — Omar Casillashernandez
(74) *Attorney, Agent, or Firm* — Altis Law Group, Inc.

(57) ABSTRACT

An electronic device and method for managing bus services includes a determination of a target bus route according to destination information input by a passenger, and a generation of riding information. A bus of the target bus route approaching a current bus stop where the passenger is located is determined to be a target bus. The riding information is sent to the target bus, and carrying information is received from the target bus. If the target bus has available passenger capacity to carry the passenger, a request message is sent to the target bus, to request a driver of the target bus to stop at the current bus stop. A notification is outputted to notify the passenger that the target bus is approaching the current bus stop.

18 Claims, 4 Drawing Sheets

ELECTRONIC DEVICE AND METHOD FOR MANAGING BUS SERVICES

BACKGROUND

1. Technical Field

Embodiments of the present disclosure relate to management technology, and more particularly to an electronic device and method for managing bus services.

2. Description of Related Art

Bus services are important public services. However, there is no effective method for managing requirements of passengers and carrying capacities of buses. For example, a bus driver has to stop at each bus stop on a specific bus route, and wait for passengers to get on the bus. If no passenger needs to get on the bus, the waiting time of the bus is wasted. Furthermore, a bus stop generally shows multiple bus routes for the passengers. The passengers have to determine one or more bus routes their needed, by looking at every shown bus route one by one. Accordingly, it is not convenient for the passengers to raise any query about the bus routes. Thus, an electronic device and method for managing bus services is desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
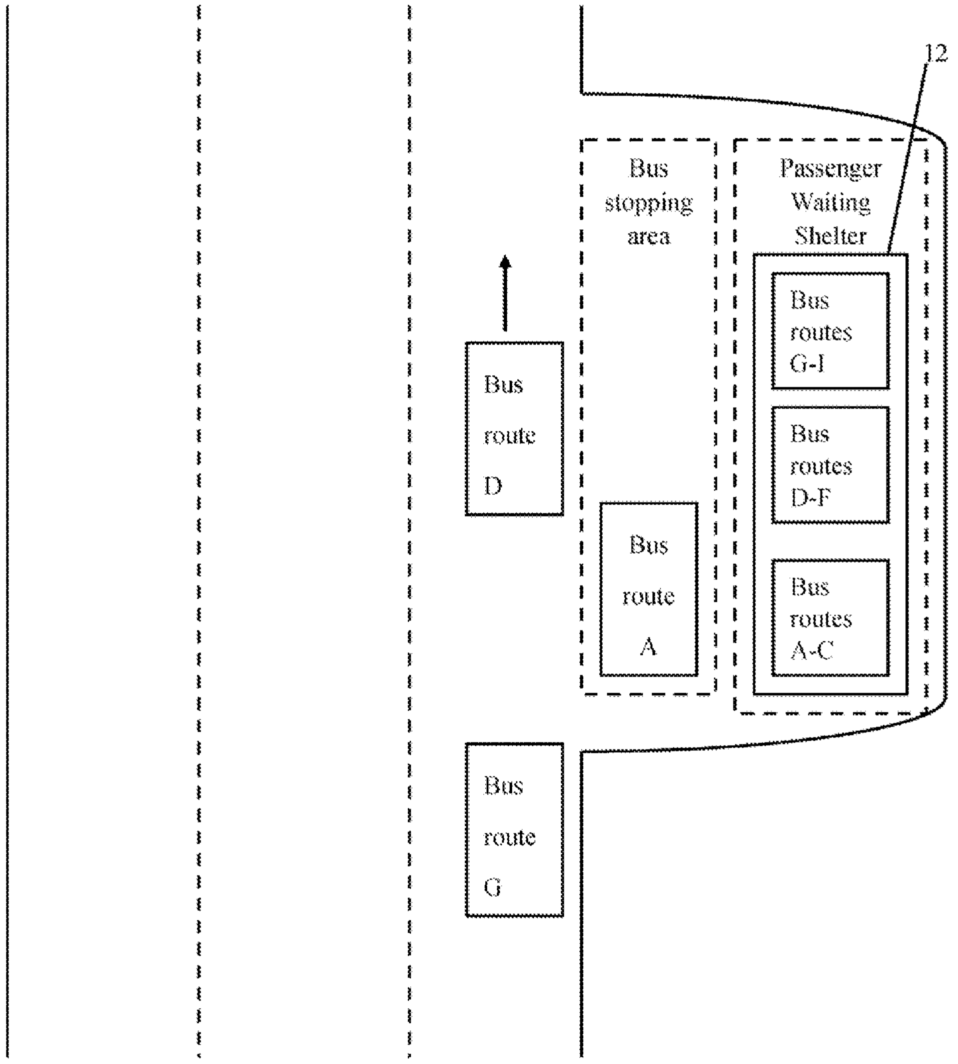
FIG. 1 is a schematic diagram of one example of a bus stop.
Figure 2:
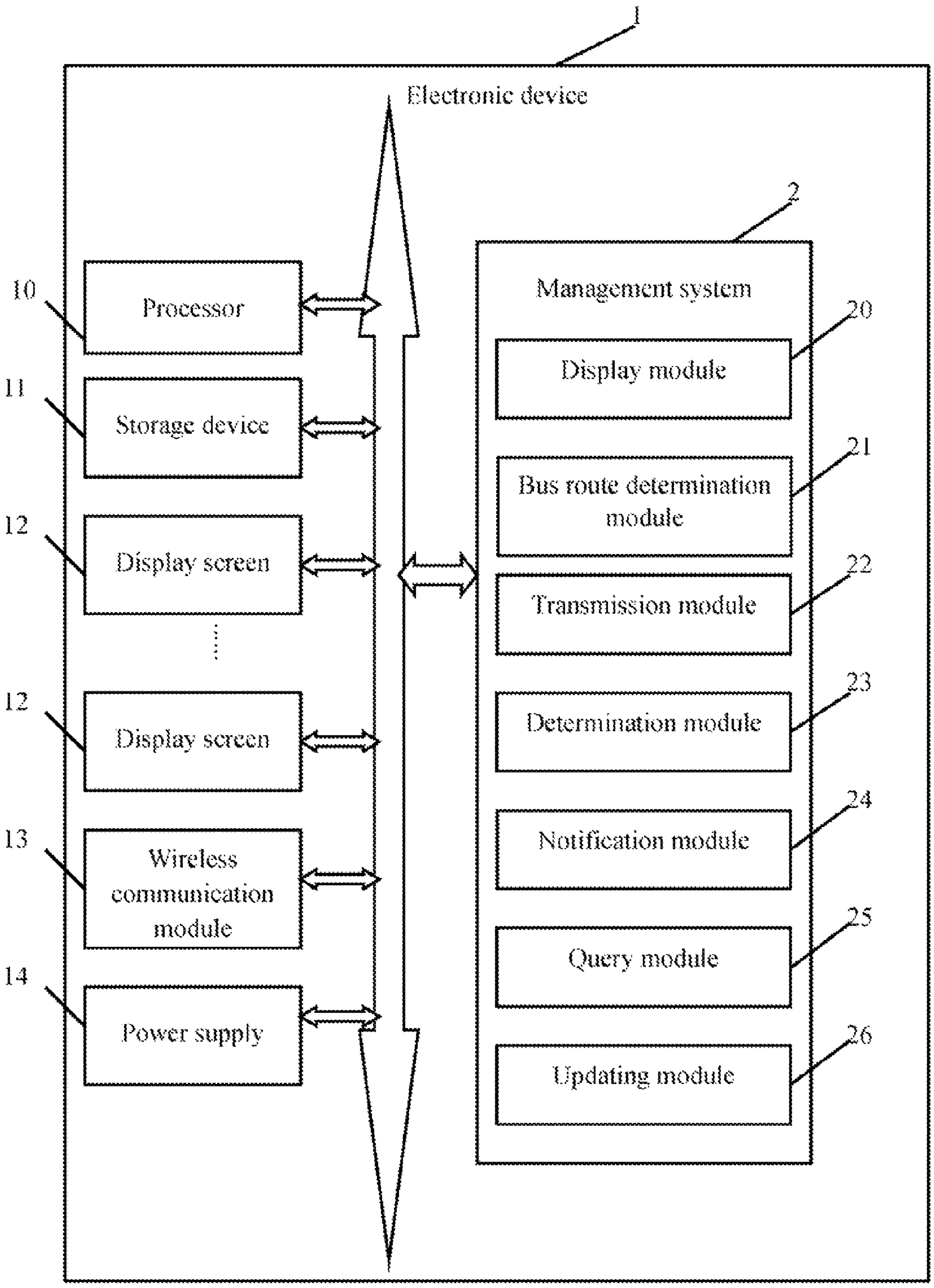
FIG. 2 is a block diagram of one embodiment of an electronic device.

FIG. 2 is a block diagram of one embodiment of an electronic device 1. The electronic device 1, such as a computer or a terminal, may be positioned at a bus stop. An example of the bus stop, as shown in FIG. 1, may provide a passenger waiting shelter and a bus stopping area. The electronic device 1 includes a management system 2. The management system 2 may be used to manage bus services. In some embodiments, the bus services may include, but are not limited to, a determination of passenger capacity of a bus, providing bus route data that a specific bus stop is on, an ability to respond to riding requirements of passengers, and notifying and warning the bus to stop for passengers. Detailed descriptions are provided below.

In some embodiments, the electronic device 1 also includes at least one processor 10, a storage device 11, at least one display screen 12, a wireless communication module 13, and a power supply 14. The at least one processor 10 executes one or more computerized operations of the electronic device 1 and other applications, to provide functions of the electronic device 1. The storage device 11 stores one or more programs, such as programs of the operating system, other applications of the electronic device 1, and various kinds of data, such as the bus route data. In some embodiments, the storage device 11 may include a memory of the electronic device 1 and/or an external storage card, such as a memory stick, a smart media card, a compact flash card, or any other type of memory card.

The at least one display screen 12 may display visible information, such as the bus routes. For example, the at least one display screen 12 may be a touch panel, and the passengers may operate the electronic device 1 by touching the display screen 12. The at least one display screen 12 may be positioned under/on the passenger waiting shelter of the bus stop. As shown in FIG. 1, three display screens 12 are distributed on the bus stop, each of the display screens may display different bus routes, for example, a first display screen may display information of bus routes A-C, a second display screen may display information of bus routes D-F, and a third display screen may display information of bus routes G-I. Further referring to FIG. 3, the at least one display screen 12 may show a plurality of display areas, for example, a first display area 120, a selection button 122, and a second display area 124. Detailed descriptions of different display areas are provided below. In other embodiments, the at least one display screen 12 may be a peripheral device in communication with the electronic device 1.

The wireless communication module 13 is used to help the electronic device 1 to communicate with the buses. In some embodiments, each bus is equipped with a wireless communication module, a storage device, and a reader. The wireless communication module 13 and the wireless communication module on each bus are used to establish a communication between the electronic device 1 and each bus through a wireless network, such as WIFI. For example, the storage device on the bus may store carrying information of the passengers on the bus and other relevant data (e.g., a route number, a passenger capacity) of the bus. The reader may read the stored information, and the wireless communication module on the bus may transmit the read information to the electronic device 1, and receive relevant data (e.g., riding information of the passengers) from the electronic device 1 through the communication.

The power supply 14 supplies power to the electronic device 1. The power supply 14 may be batteries, or solar power, for example.

In some embodiments, the management system 2 includes a display module 20, a bus route determination module 21, a transmission module 22, a determination module 23, a notification module 24, a query module 25, and a updating module 26. The modules 20-26 may include computerized codes in the form of one or more programs stored in the storage device 11. The computerized codes include instructions executed by the at least one processor 10 to provide functions for modules 20-26. Details of these functions follow.

Figure 3:
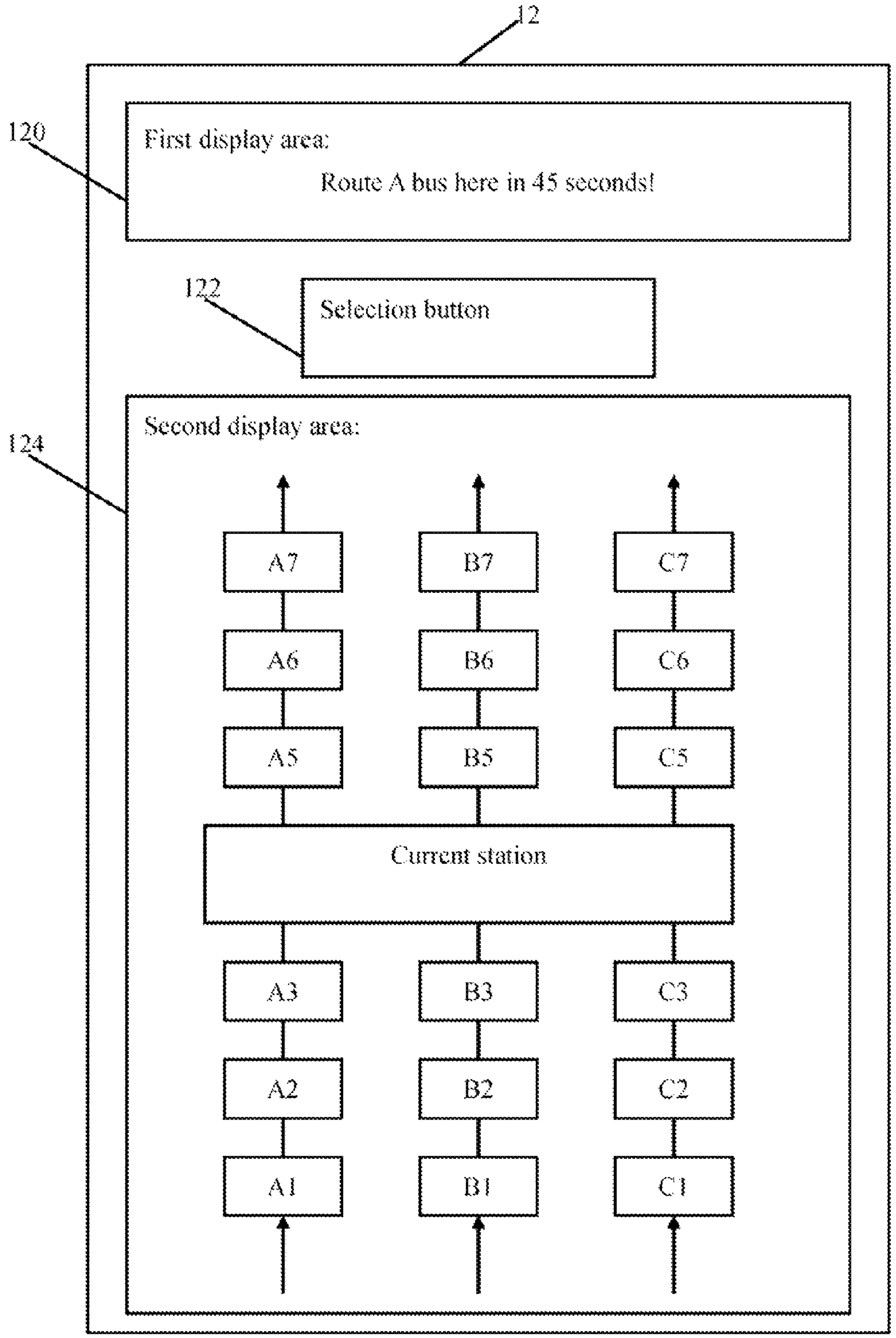
FIG. 3 is a schematic diagram of one embodiment of display information provided by the electronic device of FIG. 2.

The display module 20 may be used to display one or more bus routes on the display screen 12. In some embodiments, the displayed bus routes may be bus routes include a current bus stop where the electronic device 1 is positioned. As shown in FIG. 3, the second display area 124 of the display screen 12 shows three bus routes A, B, and C which include the current bus stop.

A passenger at the current bus stop may select a destination (e.g., B7 in FIG. 3) from a bus route (e.g., the bus route B in FIG. 3) displayed on the second display area of the display screen 12, using the selection button 122. For example, when the passenger presses the selection button 122, the locations and names (if any) of all stops on each bus route are displayed on the display screen 12, and a stop name of the destination is highlighted. Then the passenger may select the destination by pressing or clicking on the stop name of the destination.

The bus route determination module 21 determines a target bus route in response to receiving destination information input by the passenger. In some embodiments, the destination information may include a stop name of the destination. For example, once the user selects the destination by clicking on the stop name, the bus route determination module 21 receives the destination information. The bus route determination module 21 further generates riding information according to the target bus route. For example, the riding information may include a number of the passengers need to take the buses of the target bus route.

If there is only one bus route passing through the destination, the bus route determination module 21 determines the bus route as the target bus route. If multiple bus routes include the destination, in a first embodiment, the bus route determination module 21 determines all the multiple bus routes as the target bus routes. In a second embodiment, the passenger may further select one or more bus routes from the multiple bus routes, the bus route determination module 21 determines the selected bus routes as the target bus route.

The transmission module 22 receives and transmits data between the electronic device 1 and the bus through the wireless communication module 13. In some embodiments, the wireless communication module 13 may communicate with the bus under the condition that a distance between the electronic device 1 and the bus is less than or equal to a predetermined threshold value for a wireless range. The predetermined threshold value may be preset according to the ability or performance of the wireless communication module 13.

When the wireless communication module 13 has established a communication between the electronic device 1 and the bus, the transmission module 22 may receive relevant information (e.g., a bus route number of the bus) from the bus.

The determination module 23 determines a bus of the target bus route approaching the current bus stop as a target bus, according to the received information. For example, if the target bus route is "B," and a bus of the target bus route "B" is approaching the bus stop, the determination module 23 determines that the approaching bus is the target bus.

The transmission module 22 sends the riding information to the target bus, and receives carrying information from the target bus. In some embodiments, the carrying information may include, but is not limited to a passenger capacity of the target bus, a number of the passengers presently on the target bus, and destination information of the passengers on the target bus. For example, each bus may collect destination information of the passengers on the bus. Specifically, a computing system of the bus may provide a bus route of the bus for the passengers on the bus, each of the passengers may select a destination from the provided bus route. Then the computing system of the bus collects information of the selected destinations to determine the bus stops that the passengers want to get off.

The determination module 23 determines whether the target bus has available passenger capacity according to the carrying information received from the target bus and the riding information. For example, if the carrying information represents that the target bus is fully loaded and no passenger on the target bus needs to get off at the current bus stop, the determination module 23 determines that the target bus has no available passenger capacity. If the carrying information represents that the target bus is not fully loaded, or even if the target bus is fully loaded but there are passengers on the target bus are expected to get off at the current bus stop, the determination module 23 determines that the target bus has available passenger capacity.

If the target bus has or will have available passenger capacity to carry the passenger at the current bus stop, the transmission module 22 sends a request message to the target bus to request a driver of the target bus to stop at the current bus stop. The notification module 24 outputs a notification to notify the passenger that the target bus is approaching the current bus stop. In some embodiments, the notification module 24 may output the notification by displaying the notification on the display screen 12, and/or broadcasting the notification using a loudspeaker of the electronic device 1. As shown in FIG. 3, the notification module 24 displays the notification "Route A bus here in 45 seconds" on a first display area 120 of the display screen 12.

If the target bus has no available passenger capacity to carry the passenger located on the current bus stop, the transmission module sends a do-not-stop message to inform the driver of the target bus not to stop at the current bus stop. That is, the target bus may come to a next bus stop without stopping at the current bus stop, thus the travelling time and the waiting time of the target bus is saved. The notification module 24 informs the passenger at the current bus stop that the target bus is not available.

In other embodiments, the bus route determination module 21 further receives destination information input by all the passengers at the current bus stop. The transmission module 22 further receives carrying information from each bus that is approaching the current bus stop. The determination module 23 further determines non-target buses according to the carrying information and destination information. The non-target buses represent buses that no passenger at the current bus stop needs or desires to take and no passenger on the buses needs to get off at the current bus stop. The transmission module 22 sends the do-not-stop messages to the non-target buses to inform the non-target buses not to stop at the current bus stop.

The query module 25 is operable to query the storage device 11 for one or more bus routes according to a stop name or location input by the passenger, and output a response to the query using the display screen 12 or the loudspeaker of the electronic device 1. In some embodiments, the electronic device 1 may provide a query function to the passenger by displaying a query button and a query column on the display screen 12, and provide a response column on the display screen 12 to display the response. For example, the passenger may input the queried stop name in the query column, and click on the query button to invoke the query function. Then the response column displays the response to the query.

In addition, if the query result includes one or more bus routes passing through the current bus stop, the query module 25 may highlight the one or more bus routes as a further service to prompt the passenger.

The updating module 26 may update any data (e.g., the bus route data) in the storage device 11 through a wireless communication between the electronic device 1 and any other communication device that provides new data.

Figure 4:
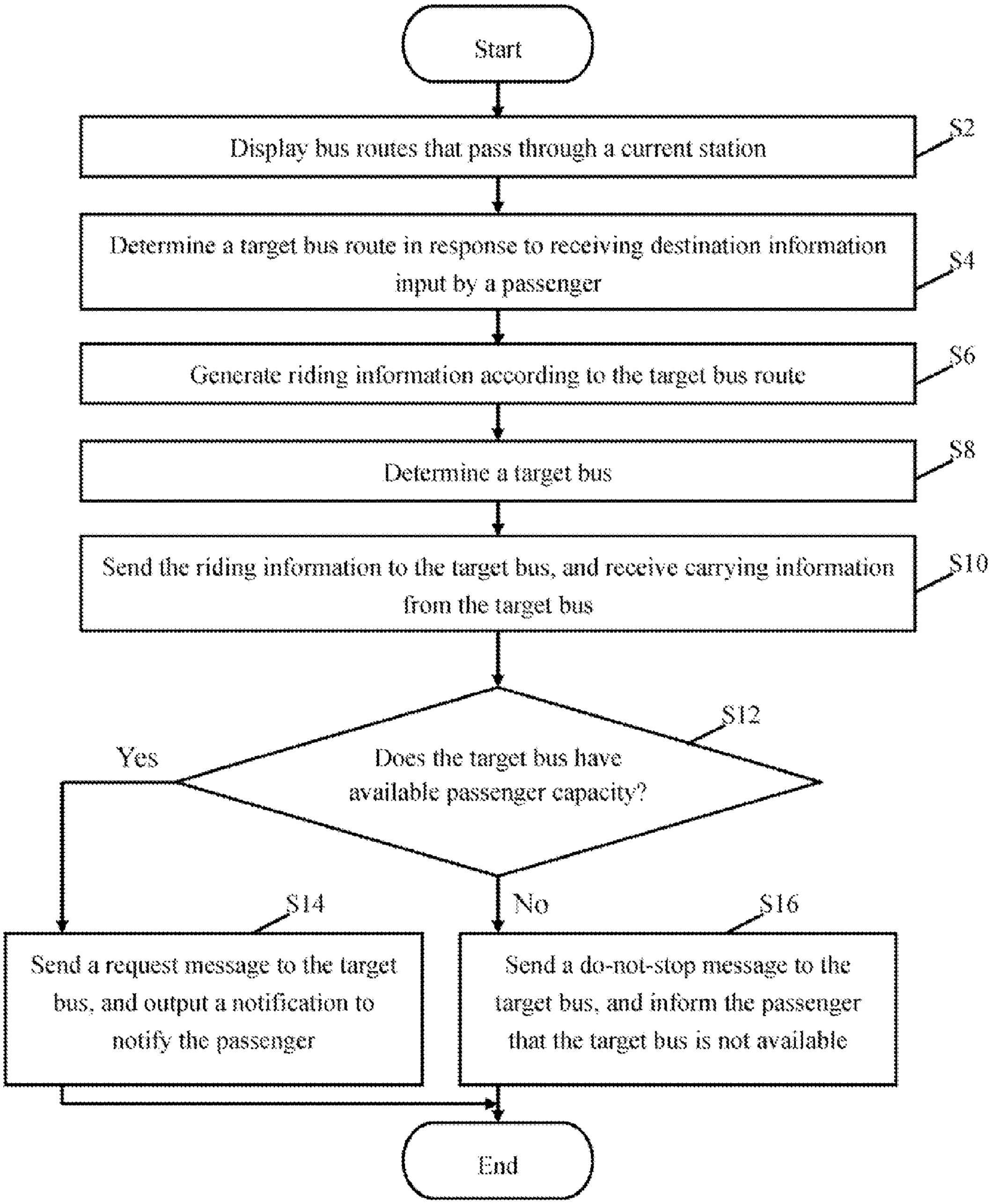
FIG. 4 is a flowchart of one embodiment of a method for managing bus services using the electronic device of FIG. 2.

FIG. 4 is a flowchart of a method for managing bus services using the electronic device 1 of FIG. 2. Depending on the embodiment, additional blocks may be added, others removed, and the ordering of the blocks may be replaced.

In block S2, the display module 20 displays one or more bus routes on the display screen 12, the displayed bus routes pass through a current bus stop where the electronic device 1 is positioned.

In block S4, the bus route determination module 21 determines a target bus route in response to receiving destination information input by a passenger. As mentioned above, the destination information may include a stop name of the destination.

In block S6, the bus route determination module 21 generates riding information according to the target bus route.

In block S8, the determination module 23 determines a bus of the target bus route approaching the current bus stop as a target bus.

In block S10, the transmission module 22 sends the riding information to the target bus, and receives carrying information from the target bus. As mentioned above, the carrying information may include passenger capacity of the target bus, a number of the passengers on the target bus, and destination stop information of the passengers on the target bus.

In block S12, the determination module 23 determines if the target bus has available passenger capacity according to the carrying information received from the target bus and the riding information.

If the carrying information represents that the target bus is not fully loaded or there are passengers on the target bus need to get off at the current bus stop even if the target bus is fully loaded, the determination module 23 determines that the target bus has or will have available passenger capacity, and the procedure goes to block S14.

If the carrying information represents that the target bus is fully loaded and no passenger on the target bus needs to get off at the current bus stop, the determination module 23 determines that the target bus has no available passenger capacity, and the procedure goes to block S16.

In block S14, the transmission module 22 sends a request message to request a driver of the that target bus to stop at the current bus stop, and the notification module 24 outputs a notification to notify the passenger that the target bus is approaching the current bus stop.

In block S16, the transmission module sends a do-not-stop message to inform the driver of the target bus not to stop at the current bus stop, and the notification module 24 informs the passenger(s) at the current bus stop that the target bus is not available.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing bus services using an electronic device positioned at a bus stop, the electronic device comprising at least one display screen, a storage device, and a wireless communication module, the storage device storing bus route data, the method comprising:

determining non-target buses, and sending do-not-stop messages to the non-target buses to inform the non-target buses not to stop at the current bus stop, the non target buses representing buses that no passenger at a current bus stop needs to get on the bus and no passenger on the buses needs to get off at the current bus stop; or determining a target bus route in response to receiving destination information input by a passenger located at the current stop, and generating riding information according to the target bus route, the target bus route passing through a destination in the destination information;

determining a bus of the target bus route approaching the current bus stop as a target bus;

sending the riding information to the target bus using the wireless communication module, and receiving carrying information from the target bus;

sending a request message to the target bus to request a driver of the target bus to stop at the current bus stop under the condition that the target bus has available passenger capacity to carry the passenger according to the carrying information; and outputting a notification to notify the passenger that the target bus is approaching the current bus stop.

2. The method according to claim 1, wherein the notification is displayed on the at least one display screen, and/or broadcasted using a loudspeaker of the electronic device.

3. The method according to claim 1, wherein the passenger inputs the destination information by selecting a bus stop of a bus route displayed on the at least one display screen, the selected bus stop being regarded as the destination.

4. The method according to claim 1, further comprising:

sending a do-not-stop message to inform the driver of the target bus not to stop at the current bus stop under the condition that the target bus has no available passenger capacity to carry the passenger according to the carrying information.

5. The method according to claim 1, further comprising:

determining that the target bus has no available passenger capacity under the condition that the carrying information represents that the target bus is fully loaded and no passenger on the target bus needs to get off at the current bus stop; or determining that the target bus has available passenger capacity under the condition that the carrying information represents that the target bus is not fully loaded or there are passengers on the target bus need to get off at the current bus stop.

6. The method according to claim 1, wherein the non-target buses are determined by:

receiving carrying information from each bus that is approaching the current bus stop;

receiving destination information input by all passengers at the current bus stop; and determining the non-target buses according to the carrying information and destination information.

7. An electronic device for managing bus services, the electronic device positioned at a bus stop, the electronic device comprising:

at least one display screen;

a wireless communication module;

a storage device storing bus route data;

at least one processor; and one or more programs stored in the storage device and being executable by the at least one processor, the one or more programs comprising:

a bus route determination module operable to determine a target bus route in response to receiving destination information input by a passenger, and generate riding information according to the target bus route, the target bus route passing through a destination in the destination information;

a determination module operable to determine a bus of the target bus route approaching a current bus stop that the passenger is located as a target bus;

a transmission module operable to send the riding information to the target bus, receive carrying information from the target bus, and send a request message to the target bus to request a driver of the target bus to stop at the current bus stop under the condition that the target bus has available passenger capacity to carry the passenger according to the carrying information;

a notification module operable to output a notification to notify the passenger that the target bus is approaching the current bus stop;

the determination module further determines non-target buses, the non target buses representing buses that no passenger at the current bus stop needs to get on the bus and no passenger on the buses needs to get off at the current bus stop; and the transmission module further sends do-not-stop messages to the non-target buses to inform the non-target buses not to stop at the current bus stop.

8. The electronic device according to claim 7, wherein the notification module outputs the notification by displaying the notification on the at least one display screen, and/or broadcasting the notification using a loudspeaker of the electronic device.

9. The electronic device according to claim 7, wherein the passenger inputs the destination information by selecting a bus stop of a bus route displayed on the at least one display screen, the selected bus stop being regarded as the destination.

10. The electronic device according to claim 7, wherein the transmission module is further operable to send a do-not-stop message to inform the driver of the target bus not to stop at the current bus stop under the condition that the target bus has no available passenger capacity to carry the passenger according to the carrying information.

11. The electronic device according to claim 7, wherein the determination module is further operable to:

determine that the target bus has no available passenger capacity under the condition that the carrying information represents that the target bus is fully loaded and no passenger on the target bus needs to get off at the current bus stop; or determining that the target bus has available passenger capacity under the condition that the carrying information represents that the target bus is not fully loaded or there are passengers on the target bus need to get off at the current bus stop.

12. The electronic device according to claim 7, wherein:

the transmission module receives carrying information from each bus that is approaching the current bus stop;

the bus route determination module receives destination information input by all passengers at the current bus stop; and the determination module determines the non-target buses according to the carrying information and destination information, the non target buses representing buses that no passenger at the current bus stop needs to take and no passenger on the buses needs to get off at the current bus stop; and the transmission module is further operable to send do not stop messages to the non target buses to inform the non target buses not to stop at the current bus stop.

13. A non-transitory storage medium storing a set of instructions, the set of instructions capable of being executed by a processor to perform a method for managing bus services using an electronic device positioned at a bus stop, the electronic device comprising at least one display screen, a storage device, and a wireless communication module, the storage device storing bus route data, the method comprising:

determining non-target buses, and sending do-not-stop messages to the non-target buses to inform the non-target buses not to stop at the current bus stop, the non target buses representing buses that no passenger at a current bus stop needs to get on the bus and no passenger on the buses needs to get off at the current bus stop; or determining a target bus route in response to receiving destination information input by a passenger located at the current stop, and generating riding information according to the target bus route, the target bus route passing through a destination in the destination information;

determining a bus of the target bus route approaching the current bus stop as a target bus;

sending the riding information to the target bus using the wireless communication module, and receiving carrying information from the target bus;

sending a request message to the target bus to request a driver of the target bus to stop at the current bus stop under the condition that the target bus has available passenger capacity to carry the passenger according to the carrying information; and outputting a notification to notify the passenger that the target bus is approaching the current bus stop.

14. The non-transitory storage medium as claimed in claim 13, wherein the notification is displayed on the at least one display screen, and/or broadcasted using a loudspeaker of the electronic device.

15. The non-transitory storage medium as claimed in claim 13, wherein the passenger inputs the destination information by selecting a bus stop of a bus route displayed on the at least one display screen, the selected bus stop being regarded as the destination.

16. The non-transitory storage medium as claimed in claim 13, wherein the method further comprises:

sending a do-not-stop message to inform the driver of the target bus not to stop at the current bus stop under the condition that the target bus has no available passenger capacity to carry the passenger according to the carrying information.

17. The non-transitory storage medium as claimed in claim 13, wherein the method further comprises:

determining that the target bus has no available passenger capacity under the condition that the carrying information represents that the target bus is fully loaded and no passenger on the target bus needs to get off at the current bus stop; or determining that the target bus has available passenger capacity under the condition that the carrying information represents that the target bus is not fully loaded or there are passengers on the target bus need to get off at the current bus stop.

18. The non-transitory storage medium as claimed in claim 13, wherein the non-target buses are determined by:

receiving carrying information from each bus that is approaching the current bus stop;

receiving destination information input by all passengers at the current bus stop; and determining the non-target buses according to the carrying information and destination information.

* * * * *